Sept. 26, 1961 W. WYSER 3,001,551
VALVE FOR RADIATORS AND THE LIKE
Filed Sept. 14, 1959
FIG.1
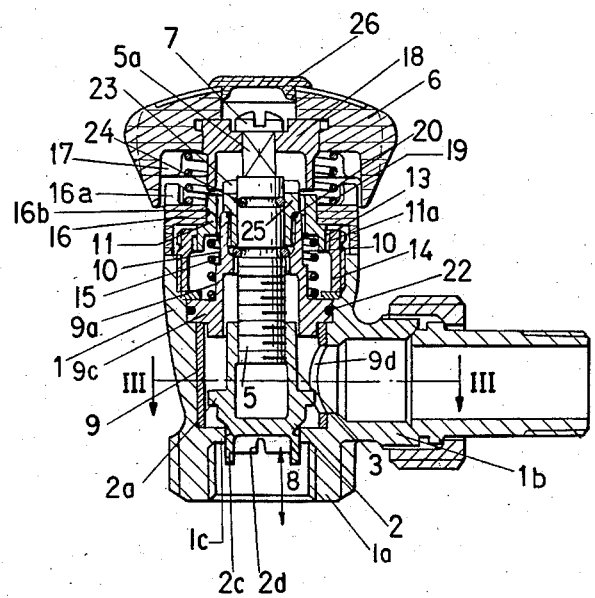
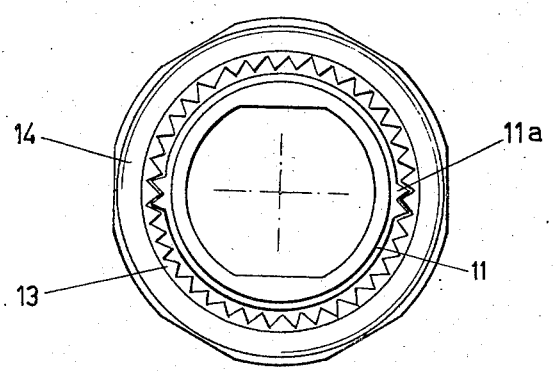
FIG.2   FIG.3   FIG.4
Inventor:
Walter Wyser
By:
Michael S. Strikis
Attorney

United States Patent Office 3,001,551
Patented Sept. 26, 1961

3,001,551
VALVE FOR RADIATORS AND THE LIKE
Walter Wyser, Bachtalstrasse 8, Ennetbaden,
Aargau, Switzerland
Filed Sept. 14, 1959, Ser. No. 839,957
Claims priority, application Switzerland Sept. 16, 1958
14 Claims. (Cl. 137—635)

The present invention relates to valves in general, and more particularly to a valve or faucet comprising two fluid flow regulating members of the type particularly suited for controlling the flow of a heating fluid in the radiator of a central heating system.

An important object of the present invention is to provide a valve comprising two-fluid flow regulating members each of which may be adjusted without tools and without requiring removal of any component parts when either a coarse or a fine adjustment in the rate of fluid flow is desired.

Another object of the invention is to provide a valve comprising two fluid regulating members both of which may be adjusted by a single handgrip means.

A further object of the invention is to provide a valve for radiators and the like which is capable of very fine and comparatively coarse adjustments by means of a single control member, which consists of a small number of component parts, which is of very compact design, and which may be readily installed in all types of fluid lines.

With the above objects in view, the invention resides in the provision of a valve assembly comprising a housing which defines a passage for the flow of a fluid, e.g. water, from the inlet to the discharge opening thereof, a first valve member which directly controls the flow of fluid through one end of the valve housing and is connected to a spindle in such a way that an angular movement of the spindle brings about axial displacements of the valve member, a handle connected to the spindle externally of the valve housing in such a way as to rotate the spindle but being axially movable with respect thereto preferably against the bias of a constantly acting resilient member, a second valve member which is non-rotatably connected with and preferably surrounds a portion of the first valve member but is normally disconnected from the handle and held against rotation in the valve housing, and a releasable coupling between the second valve member and the handle to rotate the former upon depression of the handle against the bias of the aforementioned resilient member and simultaneous disconnection of the second valve member from the housing. The second valve member controls the flow of fluid between the inlet and the discharge opening of the valve housing, and is adapted to change the rate of flow between said openings when angularly displaced by the handle with respect to the valve housing.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawing, in which:

FIG. 1 is an axial section through the housing and certain component parts of the valve embodying my invention;

FIG. 2 is a top plan view of the valve with the handle removed;

FIG. 3 is a transverse section taken along the line III—III of FIG. 1, as seen in the direction of arrows; and FIG. 4 is an enlarged plan view of the arresting or rotation preventing means between the valve housing and one of the valve members.

Referring now in greater detail to the drawing, the valve assembly comprises a housing or casing 1 formed with an inlet nipple 1a and a discharge nipple 1b. Adjacent to the inner end of the inlet nipple 1a, the housing 1 is formed with a valve seat 1c for a needle valve member 2 which latter constitutes the first regulating or control element of the valve assembly. When in sealing position, the conical lower end of the needle valve member 2 is in surface-to-surface contact with its seat 1c, as is shown in FIG. 1, to prevent the flow of a fluid into the valve housing. The upper end 3 of the valve member 2 is formed as an internally threaded cylindrical body whose threads mesh with the external threads at the lower end of a spindle 5. The non-circular, e.g. square, upper end 5a of the spindle is indirectly connected with a handle or knob 6 which is fixed thereto by means of a screw 7. The handle 6 comprises a coaxial insert 18 which may be mold-fitted therein and which is formed with a through bore having a contour complementary to the configuration of the upper spindle portion 5a. The screw 7 extends directly into the spindle portion 5a whereby its head prevents the insert 18 from sliding off the spindle. Means is provided for preventing rotation of the needle valve member 2 about its axis; therefore, whenever the spindle 5 is rotated by its handgrip means 6, the valve member 2 is caused to perform axial movements in directions toward and away from the seat 1c (see the double arrow 8) to thus either permit or prevent flow of a fluid through the nipple 1a, i.e. a rotation of the handle 6 will bring about adjustments in the rate of fluid flow into the valve housing 1. When the handle 6 is rotated, it rotates the spindle 5 by means of the insert 18 and the spindle rotates with respect to the valve member 2 whereby the meshing threads of members 2 and 5 cause the former to follow the angular movements of the spindle by moving in the axial directions indicated by the double arrow 8. For example, if the novel valve is installed in the pipe of a radiator forming part of a central heating system, the operator will manually adjust the angular position of the handle 6 and hence the axial position of the needle valve member 2 in order to change the heating effect of the radiator.

The valve comprises a second regulating element in the form of a rotary slide valve which is normally adjusted only by an expert repairman, for example, when the entire heating system is readjusted. The second regulating element consists of a rotatable valve member 9 which is formed as a hollow cylinder and, depending upon its angular position with respect to the housing 1, is capable of controlling the flow of a fluid from the inlet nipple 1a to the discharge nipple 1b. The second valve member 9 has a precise fit in the correspondingly shaped portion of valve housing 1. As is shown in FIG. 3, the flange 2a which is immediately adjacent to the conical end of the needle valve member 2 is formed with two radial key slots or recesses 2b receiving two complementary ribs or keys 9b of the second valve member 9 which prevent any angular movements of parts 2, 9 with respect to each other, i.e. the needle valve member 2 must be rotated when the angular position of the second valve member 9 is adjusted in order to vary the flow of a fluid in the valve housing from the inlet nipple 1a to the discharge nipple 1b but the needle valve member 2 is free to perform axial movements with respect to the second valve member 9.

The second valve member 9 comprises or is rigidly connected with a tubular upwardly projecting extension 9a which coaxially surrounds the spindle 5 and has two external flat zones or facets 10 (see FIG. 2). The extension 9a is received in a coaxial sleeve 11 which is formed with a pair of internal flat surfaces or facets 12a each adjacent to one of the facets 10 so as to axially slidably but non-rotatably connect the sleeve 11 with the second valve member 9. The sleeve 11 is also formed with two external facets 12 which serve as a means for transmitting rotation to the sleeve and to the valve members 2, 9. Sleeve 11 is axially movable with respect to the valve member 9 and is formed with two preferably diametrically opposed sets of external axially parallel teeth 11a which mesh with the internal teeth 13 of an annular member 14 (see FIGS. 1 and 4), the latter being screwed fast into the valve housing 1. A helical spring 15 bears against and constantly urges the sleeve 11 into the position of FIG. 1. As is shown, the other end of the resilient member 15 bears against an external collar 9c on the extension 9a of the second valve member 9 and thus urges the parts 9, 11 axially away from each other whereby the teeth 11a and 13 remain in mesh and the ring 14 prevents rotation of the second valve member (see FIG. 4). Consequently, the first valve member 2, too, is prevented from rotation due to its key-and-slot connection with the hollow second valve member 9. It will be seen that the ring 14 and the sleeve 11 constitute releasable holding or retaining means for locking the valve members 2, 9 in a given angular position.

The valve further comprises a shell 16 which surrounds the sleeve 11 and is formed with two internal facets or flat surfaces 16b which are adjacent to the external facets 12 on the sleeve 11, i.e. the shell 16 is connected for rotation with the sleeve. At its upper end, the shell 16 is formed with a pair of upwardly extending projections or noses 16a which are adapted to enter into corresponding cutouts or recesses 17 formed in the underside of the handle or knob 6. The handle is axially movable with respect to the non-circular upper end 5a of the spindle 5 against the bias of a helical restoring spring 19 and, when displaced by hand to compress the resilient member 19, the projections 16a extend into the recesses 17 to drivingly connect the shell 16 with the rotary handgrip means 6. Thus, upon depression against the action of restoring spring 19, the handle is coupled for rotation with the second valve member 9 by means of the shell 16 and the sleeve 11. In addition, any axial movements of the handle in downward direction automatically move the external teeth 11a of sleeve 11 out of mesh with the teeth 13 in the fixed ring 14 against the bias of resilient means 15; thus, the sleeve 11 is then free to rotate together with the valve member 9 when the handle 6 is turned by hand. The axial displacement of sleeve 11 is effected by the annular insert 18 which is slidable along the non-circular upper end 5a of the sleeve 5 and is urged in a direction toward the sleeve 11 by the head of screw 7 when the handle 6 is depressed against the bias of the spring 19.

The means for sealing the annular gap between the tubular extension 9a of the second valve member 9 and the spindle 5 comprises a stuffing box 23 and a pair of O-rings 20, 24. The stuffing box 23 is screwed into the extension 9a and holds the sealing ring 24 against a suitably shaped shoulder of the spindle 5. The sealing ring 20 is inserted between the stuffing box 23 and extension 9a. The sealing means between the member 9a and the housing 1 consists of an annular packing 22. When the valve member 2 is in fully open position, it forms a seal with the tubular valve portion 9a whereby the fluid is prevented from flowing through the latter and the O-ring 24 may be exchanged without requiring evacuation of fluid from the valve housing 1. Of course, the handle 6 and the member 23 must be removed before an exchange of the sealing ring 24 can take place.

In order to facilitate the adjustment into a given angular position, the shell 16 may be formed with an external indicating mark, e.g. a dot or arrow, which then cooperates with a non-represented scale applied to the housing 1, i.e. the scale then provides readings as to the momentary angular position of the second valve member 9. A cover or cap 26 is screwed into the central portion of the handle 6 to conceal the screw 7.

It will be seen that the adjustment of the valve members 2 and 9 may be brought about without any tools and without disassembling the valve, i.e. merely by rotating the handle 6 in order to reciprocate the valve member 2 in the latter's axial directions while the second valve member 9 remains idle, and by depressing the handle against the bias of the restoring spring 19 in order to angularly adjust the second valve member 9. As is best shown in FIG. 1, the lower part of the valve member 9 is formed with a radial opening or bore 9d through which the nipple 1a communicates with the discharge nipple 1b while the first valve member 2 controls the flow of fluid into the interior of the valve member 9 to the nipple 1b or vice versa. When the valve member 9 is angularly moved in clockwise or anticlockwise direction, a greater or lesser area of the opening 9d remains unscreened by the valve housing 1, i.e. angular movements of the valve member 9 determine the quantity of fluid capable of flowing from the nipple 1a through the interior of the valve member 9 to the discharge nipple 1b and vice versa.

The needle end of valve member 2 has a collar like extension 2c which fits snugly in the cylindrical part of valve seat 1c and is formed with two diametrically arranged slots 2d. Thus, upon axial movement of valve member 2 the slots 2d only permit a small and slowly increasing quantity of fluid to flow, which allows for a fine regulation before the valve is axially moved to its fully open position. Furthermore, the width of the slots 2d can be selected in such a way that the increase of the fluid flow, i.e. of the temperature in the heating radiator, is proportionate to the angle of the turn of the knob or handle 6.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A valve assembly comprising, in combination: a housing for the passage of a fluid, said housing having an inlet opening and a discharge opening; a threaded spindle having an axis and extending into said housing; a handle non-rotatably connected with and axially slidable relative to said spindle; a first valve member meshing with the spindle and non-rotatably received in said housing so that said valve member is axially movable with respect to said spindle when the spindle is rotated for alternately exposing and sealing one of said openings to the flow of fluid therethrough; a second valve member for controlling the flow of fluid between said openings in the housing, said second valve member being non-rotatably fixed to the first valve member and the latter being movable with respect to the second valve member in the axial directions of said spindle; means for releasably holding the second valve member against rotation in said housing; coupling means for connecting the second valve member with said handle when the latter is axially moved with respect to said spindle; and means connected with the handle for disconnecting said holding means from the second valve member upon axial movement of the handle with respect to said spindle whereby the second valve member is rotatable with said handle to adjust the flow of fluid between said openings.

2. A valve assembly comprising, in combination: a housing for the passage of a fluid, said housing having an inlet opening and a discharge opening; a threaded spindle having an axis and extending into said housing; a handle non-rotatably connected with and axially slidable relative to said spindle, the handle having at least one recess; a first valve member meshing with the spindle and non-rotatably received in said housing so that said valve member is axially movable with respect to said spindle when the spindle is rotated for alternately exposing and sealing one of said openings to the flow of fluid therethrough; a second valve member for controlling the flow of fluid between said openings in the housing, said second valve member being non-rotatably fixed to the first valve member and the latter being movable with respect to the second valve member in the axial directions of said spindle; means for releasably holding the second valve member against rotation in said housing, said holding means comprising a sleeve non-rotatably surrounding said second valve member, having external teeth parallel with the axis of said spindle and movable with respect to the second valve member in the axial directions of said spindle, a retaining ring fixed to said housing, formed with internal teeth parallel with the axis of said spindle and surrounding said sleeve, and resilient means operating between said second valve member and said sleeve for constantly biasing the latter into a position in which the teeth of the sleeve mesh with the teeth of said ring whereby the sleeve and the valve members are held against rotation with said spindle when the handle is rotated; coupling means for connecting the second valve member with said handle when the latter is axially moved with respect to said spindle, said coupling means comprising a shell surrounding said spindle, non-rotatably connected to said sleeve, and having at least one projection extending toward said handle and received in the latter's recess when the handle is axially moved with respect to said sleeve; second resilient means operating between said shell and said handle for constantly biasing the handle in a direction away from the shell; and means connected with the handle for disconnecting said holding means from the second valve member upon axial movement of the handle with respect to said spindle by moving the sleeve against the bias of said first mentioned resilient means into a position in which the teeth of said sleeve are disconnected from the teeth of said ring, whereby the second valve member is rotatable with said handle to adjust the flow of fluid between said openings.

3. A valve assembly comprising, in combination: a housing for the passage of a fluid, said housing having an inlet opening and a discharge opening; a threaded spindle having an axis and extending into said housing; a handle non-rotatably connected with and axially slidable relative to said spindle; a first valve member meshing with the spindle and non-rotatably received in said housing so that said valve member is axially movable with respect to said spindle when the spindle is rotated for alternately exposing and sealing one of said openings to the flow of fluid therethrough; a second valve member for controlling the flow of fluid between said openings in the housing, said second valve member being non-rotatably fixed to the first valve member and the latter being movable with respect to the second valve member in the axial directions of said spindle; means for releasably holding the second valve member against rotation in said housing; coupling means for connecting the second valve member with said handle when the latter is axially moved with respect to said spindle; resilient means for constantly biasing the handle into a position to disconnect the same from said second valve member; and means connected with the handle for disconnecting said holding means from the second valve member upon axial movement of the handle with respect to said spindle whereby the second valve member is rotatable with said handle to adjust the flow of fluid between said openings.

4. A valve assembly comprising, in combination: a housing for the passage of a fluid, said housing having an inlet opening and a discharge opening; a threaded spindle having an axis and extending into said housing; a handle non-rotatably connected with and axially slidable relative to said spindle; a first valve member meshing with the spindle and non-rotatably received in said housing so that said valve member is axially movable with respect to said spindle when the spindle is rotated for alternately exposing and sealing one of said openings to the flow of fluid therethrough; a second valve member for controlling the flow of fluid between said openings in the housing, said second valve member comprising a cylindrical portion surrounding and non-rotatably fixed to the first valve member, and the latter being movable with respect to the second valve member in the axial directions of said spindle; means for releasably holding the second valve member against rotation in said housing; coupling means for connecting the second valve member with said handle when the latter is axially moved with respect to said spindle; and means connected with the handle for disconnecting said holding means from the second valve member upon axial movement of the handle with respect to said spindle whereby the second valve member is rotatable with said handle to adjust the flow of fluid between said openings.

5. A valve assembly comprising, in combination: a housing for the passage of a fluid, said housing having an inlet opening and a discharge opening; a threaded spindle having an axis and extending into said housing; a handle non-rotatably connected with and axially slidable relative to said spindle; a first valve member meshing with the spindle and non-rotatably received in said housing so that said valve member is axially movable with respect to said spindle when the spindle is rotated for alternately exposing and sealing one of said openings to the flow of fluid therethrough; a second valve member for controlling the flow of fluid between said openings in the housing, said second valve member being non-rotatably fixed to the first valve member and the latter being movable with respect to the second valve member in the axial directions of said spindle; means for releasably holding the second valve member against rotation in said housing; coupling means for connecting the second valve member with said handle when the latter is axially moved with respect to said spindle; and means comprising an annular insert fixed to the handle for disconnecting said holding means from the second valve member upon axial movement of the handle with respect to said spindle whereby the second valve member is rotatable with said handle to adjust the flow of fluid between said openings.

6. A valve assembly comprising, in combination: a housing for the passage of a fluid, said housing having an inlet opening and a discharge opening; a threaded spindle having an axis and extending into said housing; a handle non-rotatably connected with and axially slidable relative to said spindle; a first valve member meshing with the spindle and non-rotatably received in said housing so that said valve member is axially movable with respect to said spindle when the spindle is rotated, said valve member comprising a conical end portion for alternately exposing and sealing one of said openings to the flow of fluid when the spindle is rotated by said handle to axially move said valve member; a second valve member for controlling the flow of fluid between said openings in the housing, said second valve member being non-rotatably fixed to the first valve member and the latter being movable with respect to the second valve member in the axial directions of said spindle; means for releasably holding the second valve member against rotation in said housing; coupling means for connecting the second valve member with said handle when the latter is axially moved with respect to said spindle; and means connected with the handle for disconnecting said holding means from the second valve member upon axial movement of the handle with respect to said spindle whereby the second valve member is rotatable with said handle to adjust the flow of fluid between said openings.

7. A valve assembly comprising, in combination: a housing for the passage of a fluid, said housing having an inlet opening and a discharge opening; a threaded spindle having an axis and extending into said housing; a handle non-rotatably connected with and axially movable relative to said spindle; a first valve member meshing with the spindle and non-rotatably received in said housing so that said valve member is axially movable with respect to said spindle when the spindle is rotated for alternately exposing and sealing one of said openings to the flow of fluid therethrough; a second valve member for controlling the flow of fluid between said openings in the housing, said second valve member having a cylindrical portion surrounding said first valve member and non-rotatably fixed thereto, the first valve member being movable with respect to the second valve member in the axial direction of said spindle and forming with said portion a seal when moved away from said one opening; means for releasably holding the second valve member against rotation in said housing; coupling means for connecting the second valve member to said handle when the latter is axially moved with respect to said spindle; and means connected with the handle for disconnecting said holding means from the second valve member upon axial movement of the handle with respect to said spindle whereby the second valve member is rotatable with said handle to adjust the flow of fluid between said openings.

8. A valve assembly comprising, in combination: a housing for the passage of a fluid, said housing having an inlet opening and a discharge opening; a threaded spindle having an axis and extending into said housing; a handle non-rotatably connected with and axially movable relative to said spindle; a first valve member meshing with the spindle and non-rotatably received in said housing so that said valve member is axially movable with respect to said spindle when the spindle is rotated for alternately exposing and sealing one of said openings to the flow of fluid therethrough; a second valve member for controlling the flow of fluid between said openings in the housing, said second valve member having a cylindrical portion surrounding said first valve member and non-rotatably fixed thereto, the first valve member being movable with respect to the second valve member in the axial direction of said spindle and forming with said portion a seal when moved away from said one opening; a stuffing box on the spindle at a point distant from said first valve member; at least one sealing ring between said second valve member and the spindle adapted to be removed upon separation of the handle and of the stuffing box from said spindle; means for releasably holding the second valve member against rotation in said housing; a coupling means for connecting the second valve member to said handle when the latter is axially moved with respect to said spindle; and means connected with the handle for disconnecting said holding means from the second valve member upon axial movement of the handle with respect to said spindle whereby the second valve member is rotatable with said handle to adjust the flow of fluid between said openings.

9. A valve for radiators and the like comprising, in combination: a housing for the passage of a fluid, said housing having an inlet nipple and a discharge nipple; a spindle having an axis, extending into said housing and having an externally threaded end in said housing; a handle non-rotatably connected with the spindle externally of said housing and slidable in the axial directions of the spindle; a first valve member in the housing having a sealing end adjacent to one of said nipples and an internally threaded cylindrical end meshing with the end of said spindle; a second valve member for controlling the flow of fluid in the housing between said nipples, said second valve member surrounding the first valve member and non-rotatably fixed thereto, the first valve member being movable with respect to the second valve member in the axial directions of said spindle; means for releasably holding the second valve member against rotation in said housing whereby the sleeve causes axial movements of said first valve member when rotated by said handle and the first valve member moves toward and away from said one nipple for controlling the flow of fluid therethrough; coupling means for connecting the second valve member with said handle when the latter is axially moved with respect to said spindle; and means operatively connected with the handle for disconnecting said holding means from said second valve member upon axial movement of the handle with respect to said spindle whereby the second valve member is rotatable with said handle to adjust the flow of fluid between said nipples.

10. A valve for radiators and the like comprising, in combination: a housing for the passage of a fluid, said housing having an inlet nipple and a discharge nipple; a spindle having an axis, extending into said housing and having an externally threaded end in said housing; a handle non-rotatably connected with the spindle externally of said housing and slidable in the axial directions of the spindle; a first valve member in the housing having a sealing end adjacent to one of said nipples and an internally threaded cylindrical end meshing with the end of said spindle; a second valve member for controlling the flow of fluid in the housing between said nipples, said second valve member surrounding the first valve member and non-rotatably fixed thereto, the first valve member being movable with respect to the second valve member in the axial directions of said spindle; means for releasably holding the second valve member against rotation in said housing whereby the sleeve causes axial movements of said first valve member when rotated by said handle and the first valve member moves toward and away from said one nipple for controlling the flow of fluid therethrough; coupling means for connecting the second valve member with said handle when the latter is axially moved with respect to said spindle; resilient means for constantly biasing the handle into a position with respect to said spindle in which the handle is disconnected from said second valve member; and means operatively connected with the handle for disconnecting said holding means from said second valve member upon axial movement of the handle with respect to said spindle against the bias of said resilient means whereby the second valve member is rotatable with said handle to adjust the flow of fluid between said nipples.

11. A valve assembly comprising, in combination: a housing for the passage of a fluid, said housing having an inlet opening and a discharge opening; a threaded spindle having an axis and extending into said housing; a handle non-rotatably connected with and axially movable relative to said spindle; a first valve member meshing with the spindle and non-rotatably received in said housing so that said valve member is axially movable with respect to said spindle when the spindle is rotated for alternately exposing and sealing one of said openings to the flow of fluid therethrough; a second valve member for controlling the flow of fluid between said openings in the housing, said second valve member having a cylindrical portion surrounding said first valve member; a key and slot connection between said cylindrical portion and said first valve member whereby the latter is movable with respect to the second valve member in the axial direction of said spindle and forms with said cylindrical portion a fluid-tight seal when moved away from said one opening; fluid-tight sealing means between the cylindrical portion of said second valve member and said housing; means for releasably holding the second valve member against rotation in said housing; coupling means for connecting the second valve member to said handle when the latter is axially moved with respect to said spindle; and means connected with the handle for disconnecting said holding means from the second valve member upon axial movement of the handle with respect to said spindle whereby the second valve member is rotatable with said handle to adjust the flow of fluid between said openings.

12. A valve for radiators and the like comprising, in combination: a housing for the passage of a fluid, said housing having an inlet nipple and a discharge nipple; a spindle having an axis, extending into said housing and having an externally threaded end in said housing; a handle non-rotatably connected with the spindle externally of said housing and slidable in the axial directions of the spindle; a first valve member in the housing having a sealing end adjacent to one of said nipples and an internally threaded cylindrical end meshing with the end of said spindle; a second valve member surrounding the first valve member and non-rotatably fixed thereto, the first valve member being movable with respect to the second valve member in the axial directions of said spindle and the second valve member being rotatable in said housing and having a radial opening alternately exposed and screened by the housing when the second valve member is rotated for varying the rate of fluid flow between said nipples; means for releasably holding the second valve member against rotation in said housing whereby the sleeve causes axial movements of said first valve member when rotated by said handle and the first valve member moves toward and away from said one nipple for controlling the flow of fluid therethrough; coupling means for connecting the second valve member with said handle when the latter is axially moved with respect to said spindle; and means operatively connected with the handle for disconnecting said holding means from said second valve member upon axial movement of the handle with respect to said spindle whereby the second valve member is rotatable with said handle to adjust the flow of fluid between said nipples.

13. A valve for radiators and the like comprising, in combination: a housing for the passage of a fluid, said housing having an inlet nipple and a discharge nipple; a spindle having an axis, extending into said housing and having an externally threaded end in said housing; a handle non-rotatably connected with the spindle externally of said housing and slidable in the axial directions of the spindle; a first valve member in the housing having a conical sealing end adjacent to said inlet nipple and an internally threaded cylindrical end meshing with the end of said spindle; a second valve member for controlling the flow of fluid in the housing between said nipples, said second valve member surrounding the first valve member and non-rotatably fixed thereto, the first valve member being movable with respect to the second valve member in the axial directions of said spindle; means for releasably holding the second valve member against rotation in said housing whereby the sleeve causes axial movements of said first valve member when rotated by said handle and the first valve member moves toward and away from said inlet nipple for controlling the flow of fluid therethrough; coupling means for connecting the second valve member with said handle when the latter is axially moved with respect to said spindle; and means operatively connected with the handle for disconnecting said holding means from said second valve member upon axial movement of the handle with respect to said spindle whereby the second valve member is rotatable with said handle to adjust the flow of fluid between said nipples.

14. A valve for radiators and the like comprising, in combination: a housing for the passage of a fluid, said housing having an inlet nipple and a discharge nipple; a spindle having an axis, extending into said housing and having a non-circular end externally of said housing and an externally threaded end in said housing; a handle non-rotatably connected with the non-circular end of said spindle and slidable in the axial directions thereof; a first valve member in the housing having a sealing end adjacent to one of said nipples and an internally threaded cylindrical end meshing with the end of said spindle; a second valve member for controlling the flow of fluid in the housing between said nipples, said second valve member surrounding the first valve member and non-rotatably fixed thereto, the first valve member being movable with respect to the second valve member in the axial directions of said spindle; means for releasably holding the second valve member against rotation in said housing whereby the sleeve causes axial movements of said first valve member when rotated by said handle and the first valve member moves toward and away from said one nipple for controlling the flow of fluid therethrough; coupling means for connecting the second valve member with said handle when the latter is axially moved with respect to said spindle; and means operatively connected with the handle for disconnecting said holding means from said second valve member upon axial movement of the handle with respect to said spindle whereby the second valve member is rotatable with said handle to adjust the flow of fluid between said nipples.

References Cited in the file of this patent

UNITED STATES PATENTS

| | | |
|---|---|---|
| 2,153,886 | Grayson | Apr. 11, 1939 |
| 2,477,494 | Packwood | July 26, 1949 |
| 2,887,128 | Bloomberg | May 19, 1956 |

FOREIGN PATENTS

| | | |
|---|---|---|
| 359,015 | Italy | Mar. 11, 1938 |